United States Patent
Hui et al.

(10) Patent No.: US 10,349,448 B2
(45) Date of Patent: Jul. 9, 2019

(54) METHOD AND APPARATUS FOR TRANSMITTING AND RECEIVING SIGNAL IN HIGH SPEED TRAIN COMMUNICATION NETWORK

(71) Applicant: ELECTRONICS AND TELECOMMUNICATIONS RESEARCH INSTITUTE, Daejeon (KR)

(72) Inventors: Bing Hui, Daejeon (KR); Junhyeong Kim, Daejeon (KR); Yeong Jin Kim, Daejeon (KR); Il Gyu Kim, Chungcheongbuk-do (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 15 days.

(21) Appl. No.: 15/609,748

(22) Filed: May 31, 2017

(65) Prior Publication Data
US 2017/0353953 A1    Dec. 7, 2017

(30) Foreign Application Priority Data

Jun. 1, 2016   (KR) .................. 10-2016-0068404
May 31, 2017  (KR) .................. 10-2017-0067927

(51) Int. Cl.
*H04W 74/08*     (2009.01)
*H04W 56/00*     (2009.01)

(52) U.S. Cl.
CPC ....... *H04W 74/0833* (2013.01); *H04W 56/00* (2013.01)

(58) Field of Classification Search
CPC .................. H04W 74/0833; H04W 56/00
See application file for complete search history.

(56) References Cited

U.S. PATENT DOCUMENTS

| 8,805,383 B2 | 8/2014 | Park |
| 2011/0230197 A1 | 7/2011 | Wu et al. |
| 2014/0023012 A1* | 1/2014 | Sato ..................... H04B 7/04 |
| 2014/0162652 A1 | 6/2014 | Kang et al. |
| 2017/0332373 A1* | 11/2017 | Patel ................ H04W 72/0413 |

OTHER PUBLICATIONS

"Unidirectional RRH Arrangement for HST SFN", 3GPP TSG RAN WG4 Meeting #76bis, R4-155743, Oct. 2015.
"3rd Generation Partnership Project; Technical Specification Group Radio Access Network; Study on performance enhancements for high speed scenario in LTE (Release 13)", 3GPP TR 36.878 V1.1.0, Nov. 2015.

* cited by examiner

*Primary Examiner* — Ronald B Abelson
(74) *Attorney, Agent, or Firm* — LRK Patent Law Firm (57) ABSTRACT

A method for transmitting and receiving a signal using steps of transmitting an uplink signal to a base station in a duration of an uplink pilot time slot (UpPTS) of a special subframe, and waiting for a guard time (GT) before receiving a downlink signal from the base station after the transmission of the uplink signal, and a terminal transmitting and receiving a signal by using the method.

16 Claims, 9 Drawing Sheets

METHOD AND APPARATUS FOR TRANSMITTING AND RECEIVING SIGNAL IN HIGH SPEED TRAIN COMMUNICATION NETWORK

CROSS-REFERENCE TO RELATED APPLICATIONS

This application claims priority to and the benefit of Korean Patent Application Nos. 10-2016-0068404 and 10-2017-0067927, filed in the Korean Intellectual Property Office on Jun. 1, 2016 and May 31, 2017, respectively, the entire contents of which are incorporated herein by reference.

BACKGROUND OF THE INVENTION

1. Field of the Invention

The present invention relates to a method and an apparatus for transmitting and receiving a signal in a high speed train communication network.

2. Description of Related Art

Targeting the potential use cases of the $5^{th}$ generation (5G) communication system, many efforts are currently ongoing to improve long term evolution (LTE) system performance for high speed scenarios. One of the main targets is to provide an optimal quality of service (QoS) to onboard users who are traveling at up to 500 km/h.

However, the frame structure of the existing LTE system is not suitable for fast scenarios having a directional property for several reasons.

First, since the frame structure of the existing LTE system is suitable for providing service to a plurality of pieces of user equipment (UE) in a cellular environment, the frame structure of the existing LTE system is not suitable for communications between terminal equipment (TE) including a plurality of passengers having one or more UEs and an RU. Also, in the LTE system, the timing advance (TA) needs to be estimated and updated to obtain uplink synchronization of a plurality of UEs. However, the TA does not need to be estimated for each UE in the fast scenario, and it is also difficult to update TA on time. Further, preamble transmission and TA estimation of a random access (RA) procedure takes quite a long time considering the system delay due to the high speed and frequent synchronization of the train. Finally, in a high-speed scenario, the number of TEs connecting to the network at the same time is limited, and a situation in which a large number of simultaneous network access requests occur happens occasionally.

Therefore, the long preamble of the random access channel (RACH) of the LTE system is also inappropriate, and the performance of the Zadoff-Chu sequence, which is sensitive to the frequency offset, is also degraded significantly under a severe Doppler spread.

SUMMARY OF THE INVENTION

The present invention has been made in an effort to provide a method and an apparatus for transmitting/receiving a signal in high speed scenario.

In one exemplary embodiment provides a signal transmission/reception method that includes steps of transmitting an uplink signal to a base station in a duration of a UpPTS of a special subframe and waiting for a guard time before receiving a downlink signal from the base station and a terminal that performs the foregoing steps.

Another exemplary embodiment provides a base station that transmits and receives signals based on a transmission delay determined based on a special symbol located at special symbol locations included in a random access channel.

An exemplary embodiment provides a terminal of a mobile communication system. The terminal includes: a processor; a memory; and a radio frequency unit, wherein the processor executes a program stored in the memory to perform steps of: transmitting an uplink signal to a base station in a duration of an uplink pilot time slot (UpPTS) of a special subframe; and waiting for a guard time (GT) before receiving a downlink signal from the base station after the transmission of the uplink signal.

Before the transmitting of the uplink signal, the processor may execute the program to perform steps of: receiving a downlink signal from the base station in a duration of a downlink pilot time slot (DwPTS) of the special subframe; and when performing the transmitting of the uplink signal, the processor may perform transmitting the uplink signal without a waiting time after receiving the downlink signal.

The transmission of the downlink signal from the base station may be performed by the base station prior to a round-trip transmission delay from a reception of the uplink signal of the base station.

When performing the transmitting of the uplink signal, the processor may further perform transmitting the uplink signal to the base station in a duration of an uplink subframe.

A sum of the duration of the DwPTS, the duration of the UpPTS, the duration of the uplink subframe, and the guard time may be same as a duration of 2 subframes of an LTE system.

The processor may execute the program to further perform receiving a downlink signal from the base station in a duration of a downlink subframe after the waiting for the guard time.

Another exemplary embodiment provides a method for transmitting and receiving a signal of a terminal in a mobile communication system. The method includes: transmitting an uplink signal to a base station in a duration of an uplink pilot time slot (UpPTS) of a special subframe; and waiting for a guard time (GT) before receiving a downlink signal from the base station after the transmission of the uplink signal.

The method may further include receiving a downlink signal from the base station in a duration of a downlink pilot time slot (DwPTS) of the special subframe before the transmitting of the uplink signal, and the transmitting of the uplink signal may include transmitting the uplink signal without a waiting time after receiving the downlink signal.

The transmission of the downlink signal from the base station may be performed by the base station prior to a round-trip transmission delay from reception of the uplink signal of the base station.

The transmitting of the uplink signal may include transmitting the uplink signal to the base station in a duration of the UpPTS of the special subframe and a duration of an uplink subframe.

A sum of the duration of the DwPTS, the duration of the UpPTS, the duration of the uplink subframe, and the guard time may be same as a duration of 2 subframes of an LTE system.

The method may further include receiving a downlink signal from the base station in a duration of a downlink subframe after the waiting for the guard time.

Yet another exemplary embodiment provides a base station of a mobile communication system. The base station includes a processor; a memory; and a radio frequency unit, wherein the processor executes a program stored in the memory to perform steps of: estimating a transmission delay based on a special symbol included in a random access channel received from a terminal; transmitting a downlink signal to the terminal in a duration of a downlink pilot time slot (DwPTS) of a special subframe; and after the transmission of the downlink signal, waiting for a round-trip transmission delay before the base station receives an uplink signal from the terminal in a duration of an uplink pilot time slot (UpPTS) of the special subframe.

The special symbol may be located at one or more special symbol locations among n special symbol locations included in the random access channel.

When the special symbol is located at two or more special symbol locations among the n special symbol locations, the two or more special symbol locations may be consecutively located in the random access channel.

A number of the special symbol location, a length of the special symbol location, and a number of the special symbol which is transmitted by the terminal may be determined adaptively based on a system parameter and an environment.

The processor may execute the program to further perform after the waiting for the round-trip transmission delay, receiving the uplink signal from the terminal in the duration of the UpPTS of the special subframe; and waiting for a duration determined by substracting the round-trip transmission delay from the guard time.

The guard time may be same with a maximum round-trip transmission delay.

The special symbol may include connection request information for a network access.

The above information disclosed in this Background section is only for enhancement of understanding of the background of the invention and therefore it may contain information that does not form the prior art that is already known in this country to a person of ordinary skill in the art.

DETAILED DESCRIPTION OF THE EMBODIMENTS

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, terminal equipment (TE) may be called a terminal, a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine-type communication device (MTC device), and the like and may include all or some of the functions of the MS, the MT, the AMS, the HR-MS, the SS, the PSS, the AT, the UE, the MTC device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like, and may include all or some of the functions of the ABS, the HR-BS, the node B, the eNodeB, the AP, the RAS, the BTS, the MMR-BS, the RS, the RN, the ARS, the HR-RS, the small base stations, and the like.

Figure 1:
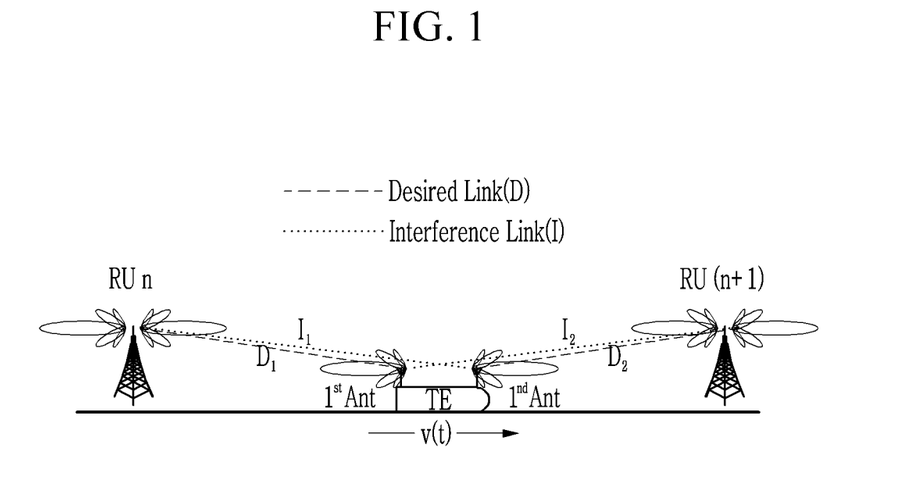
FIG. 1 is a diagram schematically illustrating a directional network for high speed train communications according to an exemplary embodiment.
Figure 2:
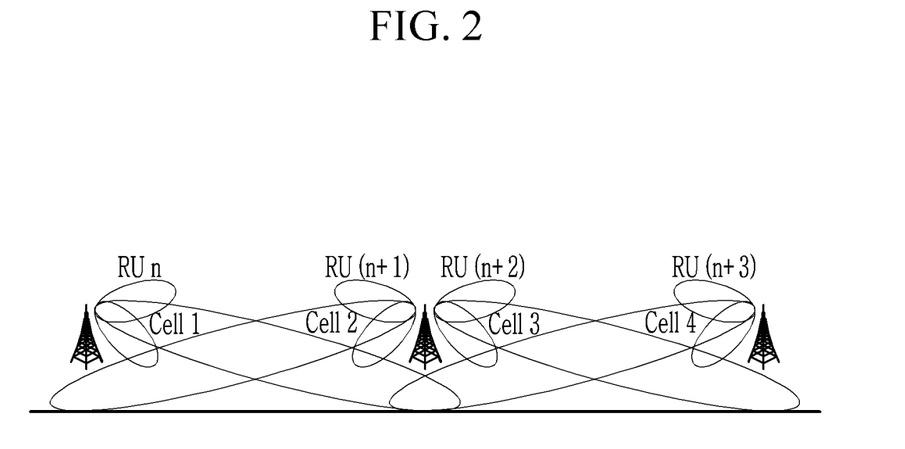
FIG. 2 is a diagram illustrating a cell coverage of the directional network having directional beams according to an exemplary embodiment.

FIG. 1 is a diagram schematically illustrating a directional network for high speed train communications according to an exemplary embodiment, and FIG. 2 is a diagram illustrating cell coverage of the directional network having directional beams according to an exemplary embodiment.

Referring to FIG. 1, a directional antenna is equipped at a radio unit (RU) of a base station of a high speed train (HST), and two directional antennas are equipped for each TE, at the front and rear portions of the TE. The functions of the HST base station include a digital unit (DU) and an RU. The TE may serve as a mobile relay and may provide a wireless backhaul link to the onboard users. The reason of employing the TE instead of establishing an individual direct link between the onboard UE and the RU is to avoid the group handover problem. As shown in FIG. 1, each TE includes two antennas (a first antenna and a second antenna), and the TE may communicate with a forward RU ($RU_{n+1}$) and a backward RU ($RU_n$). That is, the first antenna forms a radio link D1 with $RU_n$, and the second antenna forms a radio link D2 with $RU_{n+1}$. Also, each link acts as an interference link ($I_1$ and $I_2$) with respect to each other.

The directional network shown in FIG. 2 includes four cells, with one cell being formed by each RU. The cell 1 represents the coverage of $RU_n$, the cell 2 represents the coverage of $RU_{n+1}$, the cell 3 represents the coverage of $RU_{n+2}$, and the cell 4 represents the coverage of $RU_{n+3}$. That is, all the RUs form cells only in one direction of the moving direction of the TE or the opposite direction to the moving direction. Further, the boundary of each cell may reach the location point of the next RU.

Taking into account the wireless backhaul link between the TE and the RU, the TE behaves like a super UE in terms of network and the RU. In this case, the time division duplex (TDD) frame of the existing LTE system is not suitable for the directional network as shown in FIG. 1 and FIG. 2.

Figure 3A:
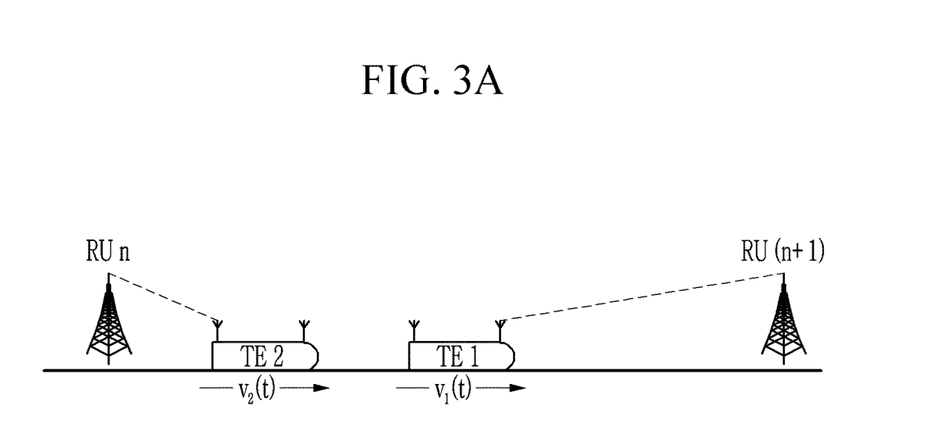
FIGS. 3A and 3B are diagrams schematically illustrating a directional network in which two trains are connected to different RUs according to an exemplary embodiment.
Figure 3B:
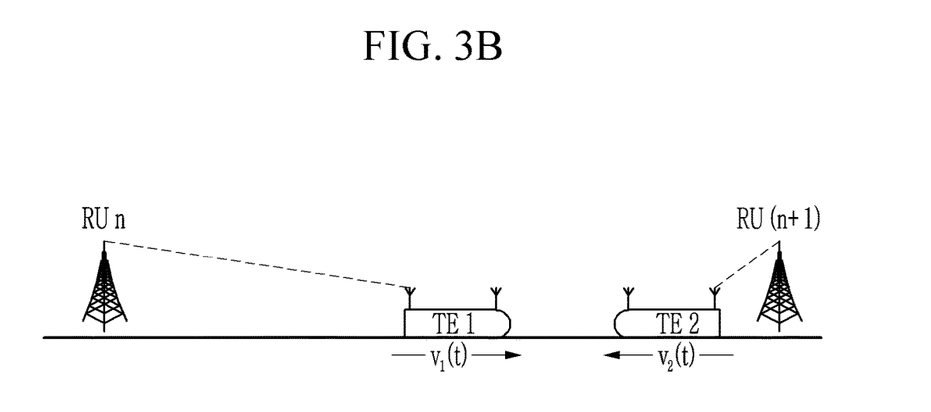

FIGS. 3A and 3B are diagrams schematically illustrating a directional network in which two trains are connected to different RUs according to an exemplary embodiment.

In the present description, since the train speed is fast and the coverage of the RU is generally not large, each RU performs communication with one TE using the same radio resources at the same time. For example, if a millimeter wave (mmWave) frequency band is used as a wireless backhaul link to provide ultrahigh data rates, the coverage of the RU is less than 1000 meters, and in this case, a distance between two consecutive trains traveling on the same railway line in the same direction may be long enough for safety, and the two trains may not be included in the same RU coverage. Referring to FIG. 3A, the second TE is connected to $RU_n$, and the first TE is connected to $RU_{n+1}$. That is, even if both of the TEs are located between neighbor RUs, the antenna connected to each TE performs communication with one RU.

When two trains proceeding the opposite railway are in the same RU coverage, other resources may be used (i.e., given degrees of freedom) in terms of space, frequency, time, or code to avoid multiple connections to the same RU.

For example, since each TE includes two antennas, it is possible to provide services to a plurality of trains based on the degree of freedom of the antenna, and to provide services to the TE using the same radio resource at the same time.

Figure 4:
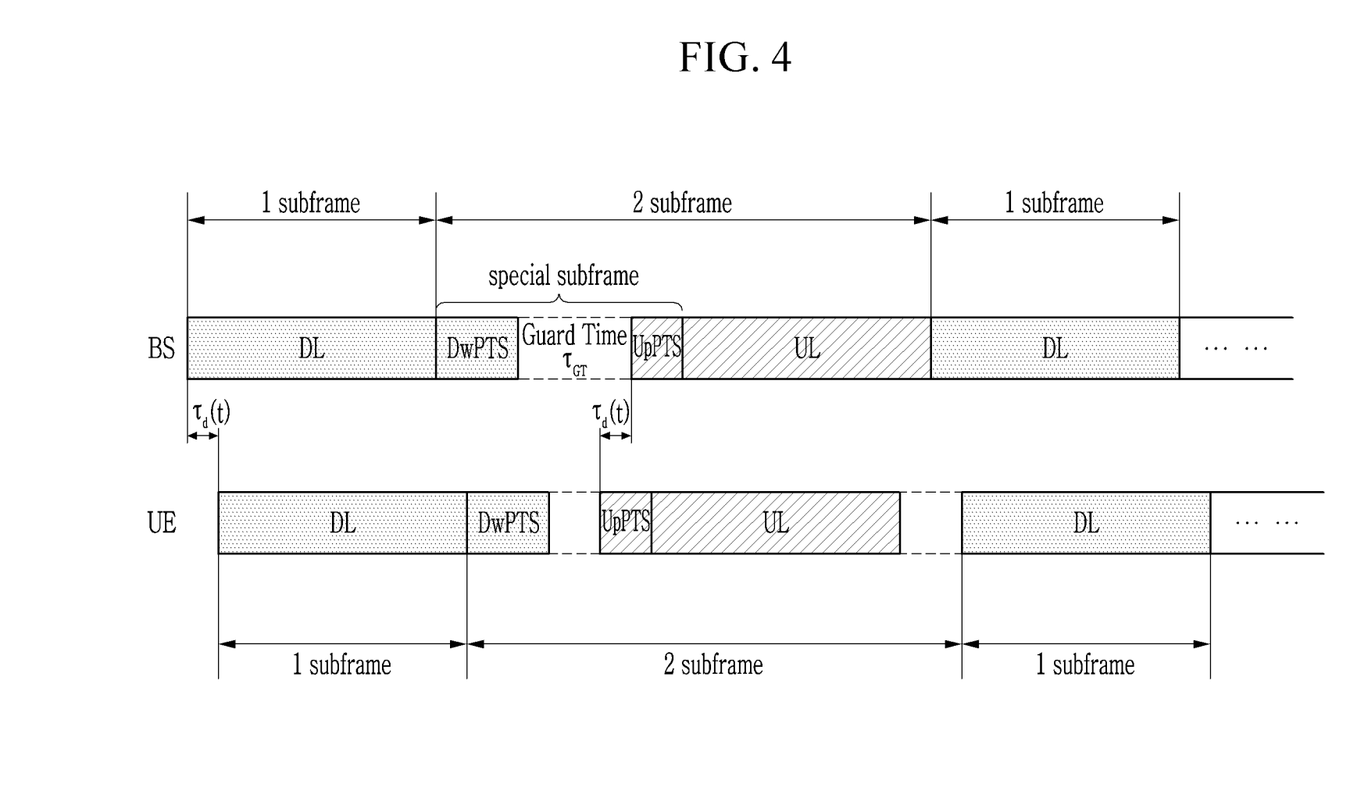
FIG. 4 is a diagram schematically illustrating a transmission delay between a base station and a terminal using an LTE TDD frame configuration 2.

FIG. 4 is a diagram schematically illustrating a transmission delay between a base station and a terminal using an LTE TDD frame configuration 2.

In the LTE system, a TDD subframe includes a special subframe between a downlink (DL) subframe and an uplink (UL) subframe, and a special subframe includes a downlink pilot time slot (DwPTS), a guard time (GT) of $\tau_{GT}$, and an uplink pilot time slot (UpPTS). At the base station side, the frame structure is fixed.

However, since there are several UEs to be connected to the network through UL, UL synchronization is required for all UEs so that all UL data of different UEs can be received by the base station at the same time.

In an ideal case, as shown in FIG. 4, if the DL transmission delay is $\tau_d(t)$ for a particular UE, then the TA for the UL transmission of a particular UE is $\tau_d(t)$.

Depending on the location of the UE, the TA values for the different UEs are also different. Therefore, at the side of the base station, the timings of the DL subframe and the UL subframe are fixed. However, since there is only one TE provided by the RU in a high-speed scenario, UL synchronization for a plurality of TEs is not required. That is, no estimation of the TA is required, and all associated transmission/reception and processing are not required.

Figure 5A:
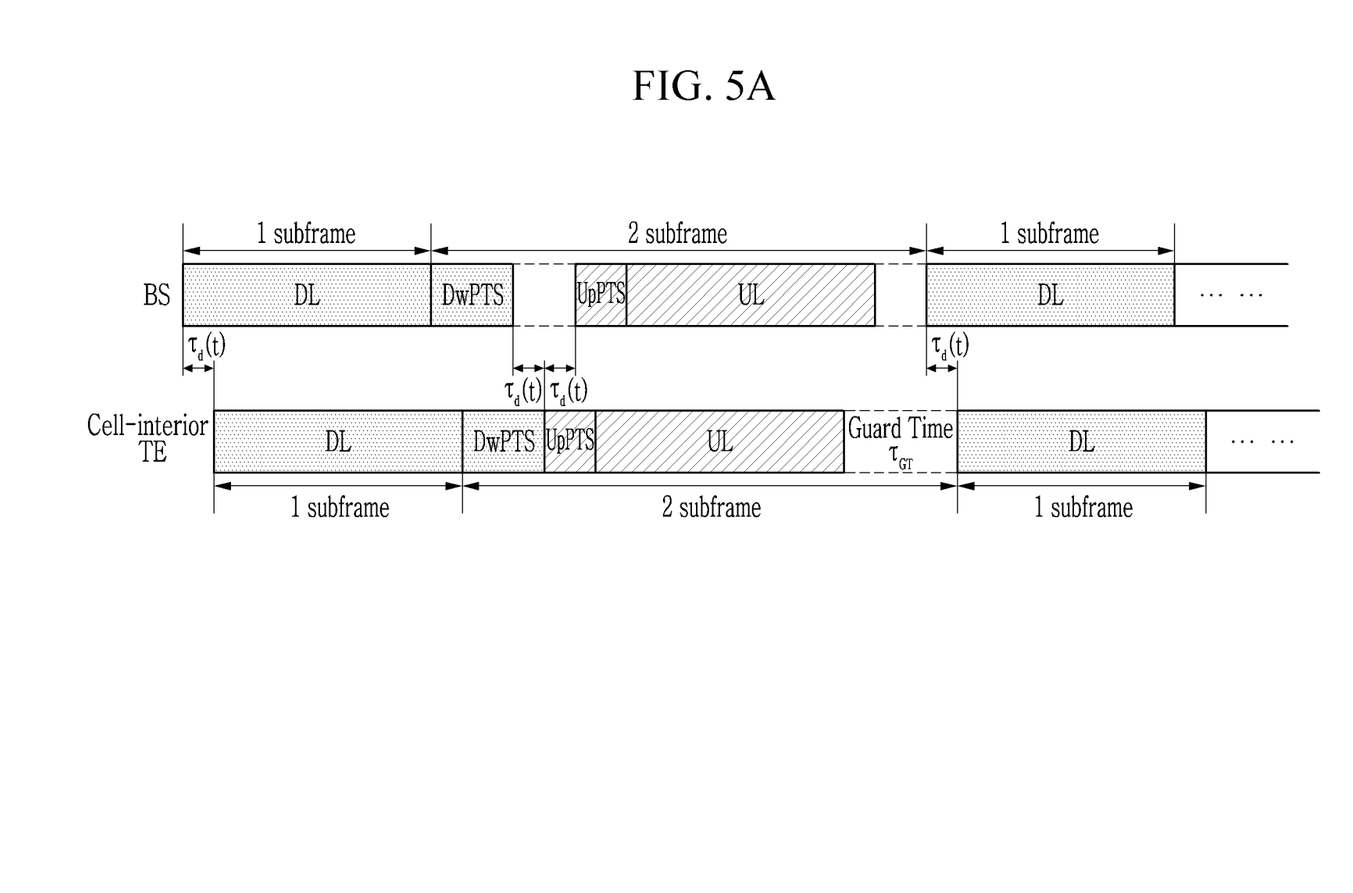
FIGS. 5A and 5B are diagrams schematically illustrating a hybrid TDD frame structure of the directional network according to an exemplary embodiment.
Figure 5B:
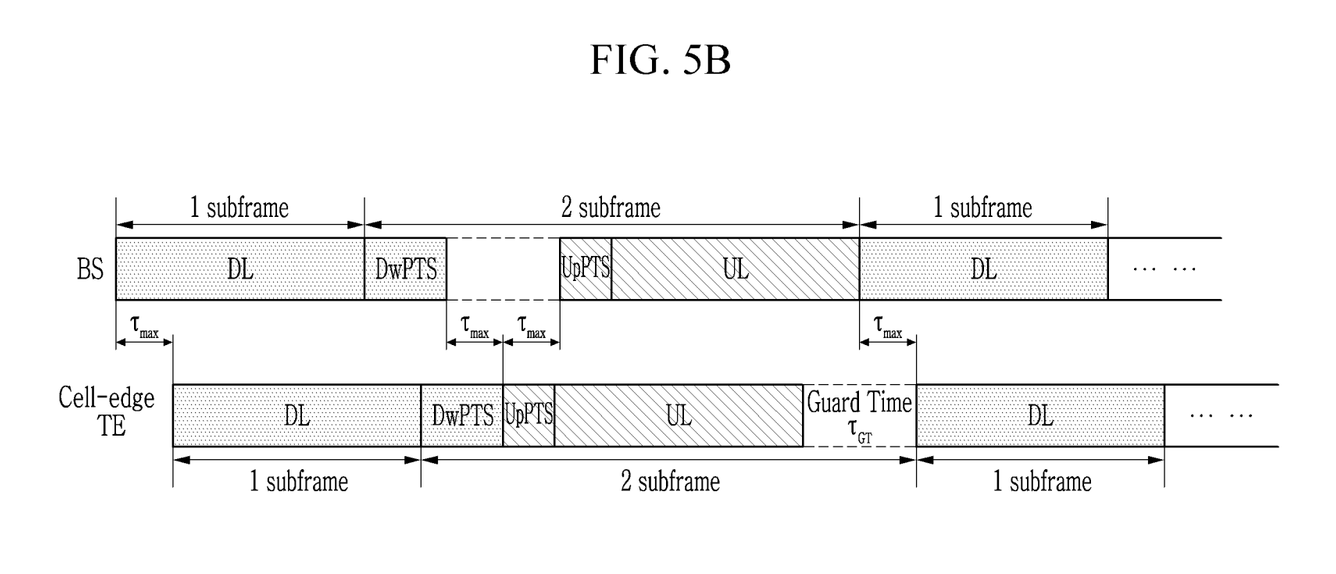

FIG. 5A and FIG. 5B are a diagram schematically illustrating a hybrid TDD frame structure of the directional network according to an exemplary embodiment.

From the perspective of the TE, the frame structure according to an embodiment has a fixed DL subframe duration and a fixed UL subframe duration. According to the embodiment, the guard time of the hybrid frame structure is located behind the DL subframe and the UL subframe.

FIG. 5A shows the frame structure for which the TE is located in the cell interior, and (b) shows the frame structure for which the TE is located at the cell edge. In both FIGS. 5A and 5B, the total duration of the DwPTS, the UpPTS, the UL subframe, and the guard time is the same as the duration of two subframes, as in the case of LTE. That is, in view of the TE, the TDD frame structure according to the embodiment is fixed for both DL and UL.

However, since the LTE system is a centralized system, the UL reception timing of the HST base station in HST communication varies with time. That is, from the viewpoint of the HST base station, the TDD frame structure according to the embodiment has a fixed DL duration and a time varying UL duration.

In FIG. 5A, the base station waits for $\tau_{GT}-2\tau_d(t)$ after receiving the uplink signal from the TE in the duration of the UpPTS and UL subframes. However, in FIG. 5B, since the $\tau_{GT}-2\tau_d(t)$ is 0, the base station receives the uplink signal from the UE and then, without a waiting time, transmits the downlink signal to the UE through the DL subframe. That is, the guard time $\tau_{GT}$ is twice the maximum transmission delay $\tau_{MAX}$ (i.e., equal to the maximum round-trip transmission delay).

Figure 6:
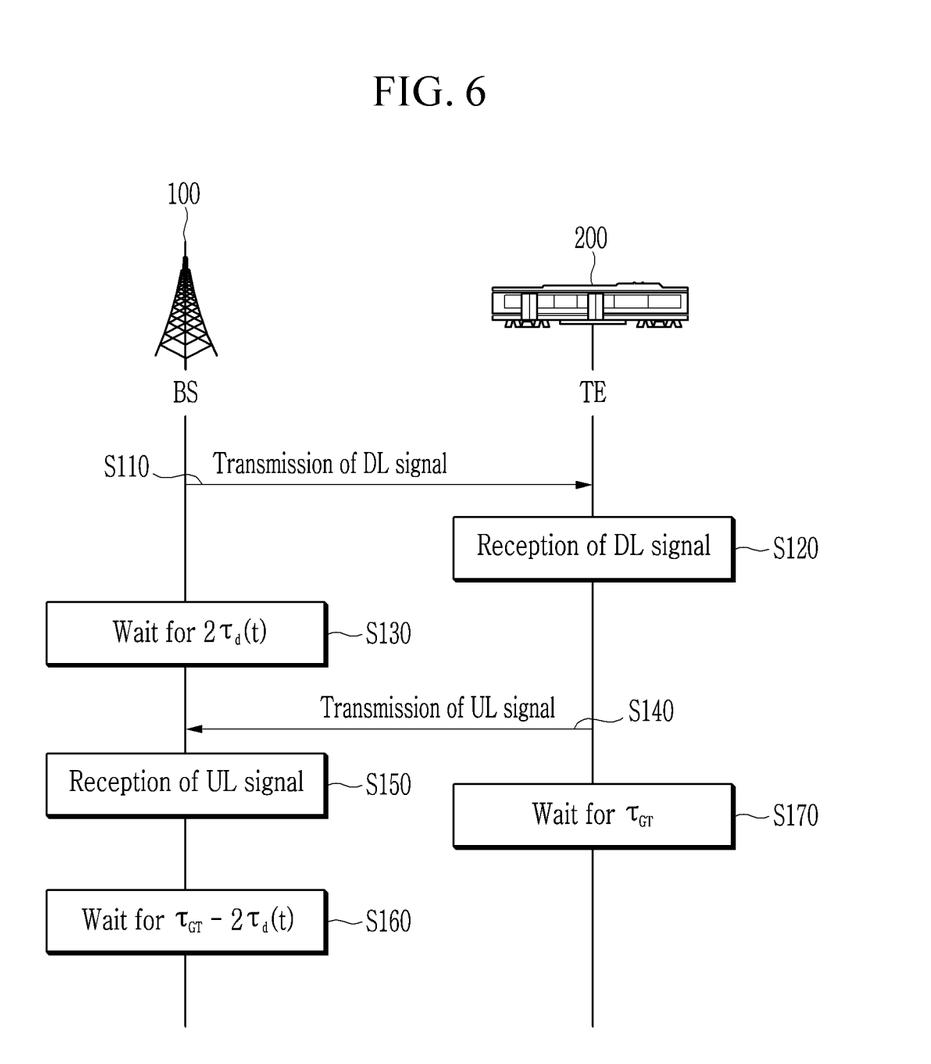
FIG. 6 is a flowchart illustrating an operation of a base station and a terminal using a hybrid TDD frame structure according to an exemplary embodiment.

FIG. 6 is a flowchart illustrating an operation of a base station and a terminal using a hybrid TDD frame structure according to an exemplary embodiment.

Referring to FIG. 6, the base station transmits a first downlink signal during a DL subframe and a DwPTS (S110), and a terminal receives the first downlink signal during a DL subframe and a DwPTS (S120). Unlike the LTE system, a base station does not transmit TA-related information when transmitting the downlink signal. After the downlink transmission, the base station waits for $2\tau_d(t)$ (i.e., a round-trip transmission delay) (S130). According to the exemplary embodiment, the base station may find out the boundary of the UL subframe by using several method and may identify the transmission delay based on the UL subframe boundary. For example, the base station may use a sounding reference signal (SRS) to find out the boundary of the UL subframe. Alternatively, the base station may recognize the boundary of the UL subframe by calculating an auto-correlation of the cyclic prefix of the OFDM symbol from the UE. Alternatively, the base station may recognize the boundary of the UL subframe using a special symbol or a short preamble sequence included in a PRACH according to an exemplary embodiment. In this case, the base station may determine the transmission delay before the downlink signal transmission step (S110).

In step (S140), the UE transmits an uplink signal in the UpPTS immediately (i.e., without a waiting time) following the DwPTS and the UL subframe following the UpPTS, and the base station receives the uplink signal in step (S150). Therefore, the time point at which the BS performs the uplink reception is a point at which $2\tau_d(t)$ elapses from the downlink transmission of the BS. Finally, the base station transmits a second downlink signal after $\tau_{GT}-2\tau_d(t)$ from the uplink reception (S160), and the terminal can receive the second downlink signal from the base station after elapse of $\tau_{GT}$ from the uplink transmission (S170).

Meanwhile, in a high-speed scenario, the physical random access channel (PRACH) of the LTE system optimized for a cellular network is not optimal because the number of TEs connected to the RU is very small and no TA is required. In the RA procedure of the LTE system, the preamble is transmitted in the PRACH, and is used for 1) informing the base station that there is an RA by the UE, and 2) estimating the TA by the base station. The LTE preamble is used to indicate the RA to the base station in high-speed scenarios because TA estimation is not needed in high-speed scenarios. In addition, the Zadoff-Chu sequence of the LTE system, which is very sensitive to frequency offset of the high-speed scenarios where Doppler spread is severe due to high-speed mobility, is not suitable. Also, the LTE preamble is designed to be very long in the time domain to ensure sufficient energy for decoding. However, in high-speed scenarios, the long duration of the preamble is also not necessary because the number of TEs connected to the RU at the same time is very small.

Figure 7:
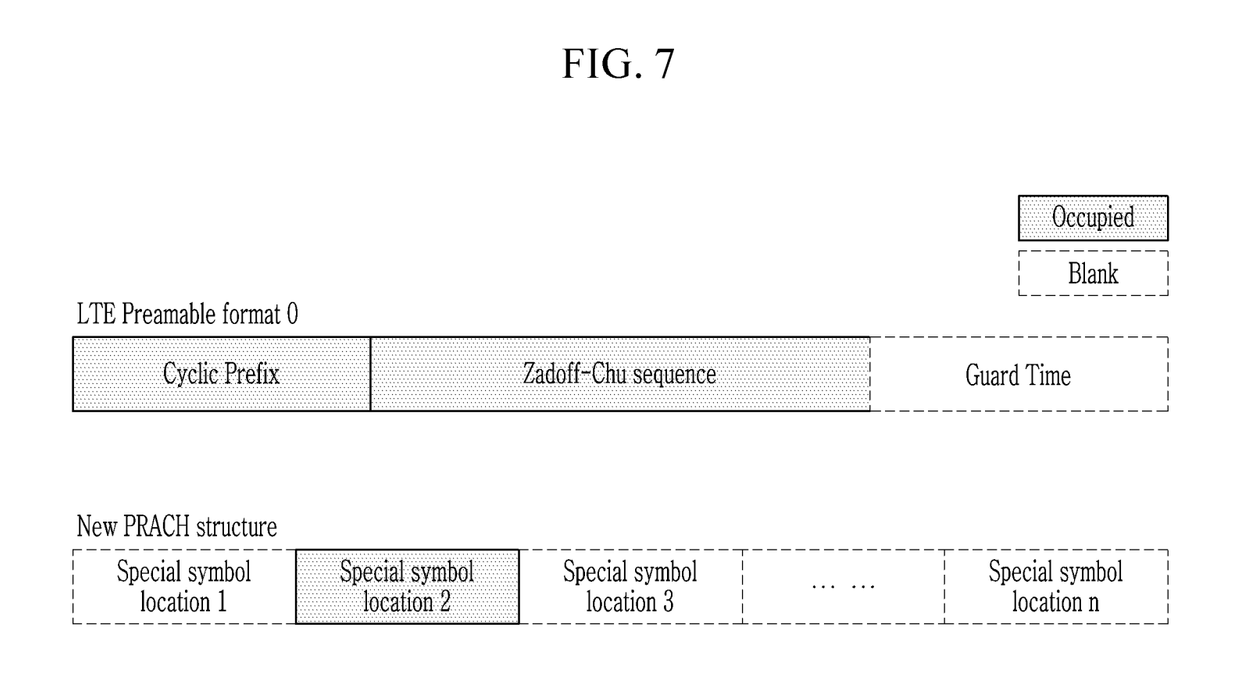
FIG. 7 is a diagram schematically illustrating PRACH signaling of a directional network according to an exemplary embodiment.

FIG. 7 is a diagram schematically illustrating PRACH signaling of a directional network according to an exemplary embodiment.

Due to the high mobility of trains, the radio channel changes rapidly in high-speed scenarios, so that a sounding reference signal (SRS) can be transmitted frequently in the UpPTS. If the SRS is sent by the TE in all UpPTSs, then the SRS may be used by the HST base station to detect the boundary of the UL subframe. In the LTE regulations, preambles are defined in five different formats, with different lengths and positions. Since the UpPTS is occupied by the SRS, preamble format 4 of the LTE standard may not be used in HST communication.

Referring to FIG. 7, a preamble format 0, which is one subframe length in the time domain, is illustrated for comparison. According to an embodiment, instead of transmitting a long Zadoff-Chu sequence as a preamble, the TE uses a special symbol for the RA. According to the embodiment, the special symbol includes connection request information for network connection, such as TE identification. The location of the special symbols transmitted by the different TEs may be randomly selected during the PRACH duration to avoid collision of multiple RA requests.

As shown in FIG. 7, the PRACH according to the embodiment includes n (n is a natural number) special symbol locations. Each TE may use at least one special symbol location to transmit network connection request information. If the TE selects more than two special symbol locations, each special symbol location may be consecutively located in the PRACH.

Referring to FIG. 7, a second special symbol location is used by the TE for the initial RA for the HST communication network. When a plurality of TEs perform RA for the network, the special symbol locations are randomly selected by a plurality of TEs. The number n of special symbol locations included in the PRACH, the length of each special symbol location, and the number of special symbols that can be transmitted by one TE can be adaptively determined based on the system parameters and environment.

As described above, since the base station and the TE do not perform UL synchronization in the high-speed scenario, the contention-based RA procedure of the LTE system can be further simplified to a contention-free RA procedure using the novel frame structure and the PRACH structure.

Figure 8:
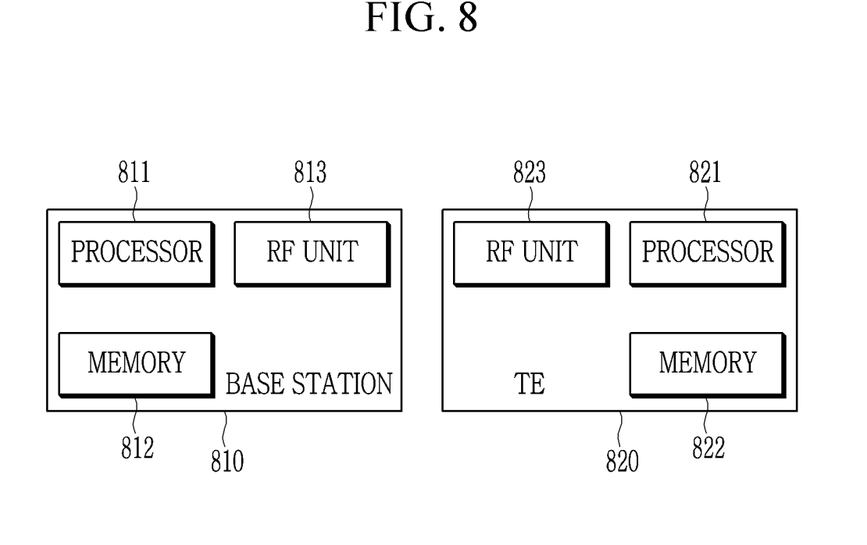
FIG. 8 is a block diagram illustrating a wireless communication system according to an exemplary embodiment.

FIG. 8 is a block diagram illustrating a wireless communication system according to an exemplary embodiment.

Referring to FIG. 8, a wireless communication system according to an exemplary embodiment of the present invention includes a base station 810 and a TE 820.

The base station 810 includes a processor 811, a memory 812, and a radio frequency unit (RF unit) 813. The memory 812 may be connected to the processor 811 to store various pieces of information for driving the processor 811 or at least one program executed by the processor 811. The radio frequency unit 813 may be connected to the processor 811 to transmit/receive a wireless signal. The processor 811 may implement functions, processes, or methods proposed by the exemplary embodiment of the present invention. In this case, in the wireless communication system according to the exemplary embodiment of the present invention, a wireless interface protocol layer may be implemented by the processor 811. An operation of the base station 810 according to the exemplary embodiment of the present invention may be implemented by the processor 811.

The TE 820 includes a processor 821, a memory 822, and a radio frequency unit 823. The memory 822 may be connected to the processor 821 to store various pieces of information for driving the processor 821 or at least one program executed by the processor 821. The radio frequency unit 823 may be connected to the processor 821 to transmit/receive a wireless signal. The processor 821 may implement functions, processes, or methods proposed by the exemplary embodiment of the present invention. In this case, in the wireless communication system according to the exemplary embodiment of the present invention, a wireless interface protocol layer may be implemented by the processor 821. An operation of the TE 820 according to the exemplary embodiment of the present invention may be implemented by the processor 821.

According to the exemplary embodiment of the present invention, the memory may be positioned inside or outside the processor and the memory may be connected to the processor through already known various means. The memory is of various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A terminal of a mobile communication system, comprising:
   a processor;
   a memory; and
   a radio frequency unit,
   wherein the processor executes a program stored in the memory to perform steps of:
   receiving a first downlink signal from a base station in a duration of a downlink pilot time slot (DwPTS) of a special subframe;
   transmitting an uplink signal to the base station in a duration of an uplink pilot time slot (UpPTS) of the special subframe without a waiting time after receiving the first downlink signal; and
   waiting for a guard time (GT) before receiving a second downlink signal from the base station after the transmission of the uplink signal.

2. The terminal of claim 1, wherein the transmission of the downlink signal from the base station is performed by the base station prior to a round-trip transmission delay from a reception of the uplink signal of the base station.

3. The terminal of claim 1, wherein when performing the transmitting of the uplink signal, the processor further performs transmitting the uplink signal to the base station in a duration of an uplink subframe.

4. The terminal of claim 3, wherein a sum of the duration of the DwPTS, the duration of the UpPTS, the duration of the uplink subframe, and the guard time is same as a duration of 2 subframes of an LTE system.

5. The terminal of claim 1, wherein the processor executes the program to further perform receiving a downlink signal from the base station in a duration of a downlink subframe after the waiting for the guard time.

6. A method for transmitting and receiving a signal of a terminal in a mobile communication system, comprising:
receiving a first downlink signal from a base station in a duration of a downlink pilot time slot (DwPTS) of a special subframe;
transmitting an uplink signal to the base station in a duration of an uplink pilot time slot (UpPTS) of the special subframe without a waiting time after receiving the first downlink signal; and
waiting for a guard time (GT) before receiving a second downlink signal from the base station after the transmission of the uplink signal.

7. The method of claim 6, wherein the transmission of the downlink signal from the base station is performed by the base station prior to a round-trip transmission delay from reception of the uplink signal of the base station.

8. The method of claim 6, wherein the transmitting of the uplink signal includes transmitting the uplink signal to the base station in a duration of the UpPTS of the special subframe and a duration of an uplink subframe.

9. The method of claim 8, wherein a sum of the duration of the DwPTS, the duration of the UpPTS, the duration of the uplink subframe, and the guard time is same as a duration of 2 subframes of an LTE system.

10. The method of claim 6, further comprising receiving a downlink signal from the base station in a duration of a downlink subframe after the waiting for the guard time.

11. A base station of a mobile communication system, comprising:
a processor;
a memory; and
a radio frequency unit,
wherein the processor executes a program stored in the memory to perform steps of:
estimating a transmission delay based on a special symbol included in a random access channel received from a terminal;
transmitting a downlink signal to the terminal in a duration of a downlink pilot time slot (DwPTS) of a special subframe;
waiting for a round-trip transmission delay determined based on the transmission delay before the base station receives an uplink signal from the terminal in a duration of an uplink pilot time slot (UpPTS) of the special subframe;
receiving the uplink signal from the terminal in the duration of the UpPTS of the special subframe; and
waiting for a duration determined by substracting the round-trip transmission delay from the guard time.

12. The base station of claim 11, wherein the special symbol is located at one or more special symbol locations among n special symbol locations included in the random access channel.

13. The base station of claim 12, wherein when the special symbol is located at two or more special symbol locations among the n special symbol locations, the two or more special symbol locations are consecutively located in the random access channel.

14. The base station of claim 11, wherein a number of the special symbol location, a length of the special symbol location, and a number of the special symbol which is transmitted by the terminal is determined adaptively based on a system parameter and an environment.

15. The base station of claim 11, wherein the guard time is same with a maximum round-trip transmission delay.

16. The base station of claim 11, wherein the special symbol includes connection request information for a network access.

* * * * *